US012763856B2

(12) United States Patent
Gaur et al.

(10) Patent No.: US 12,763,856 B2
(45) Date of Patent: Oct. 13, 2026

(54) BIDIRECTIONAL LOOPBACK AMPLIFIER FOR OPTICAL SENSING APPLICATIONS

(71) Applicant: SUBCOM, LLC, Eatontown, NJ (US)

(72) Inventors: Chandra Bhanu Gaur, Freehold, NJ (US); Haifeng Li, Morganville, NJ (US); Alexei N. Pilipetskii, Long Branch, NJ (US)

(73) Assignee: SubCom, LLC, Eatontown, NJ (US)

(*) Notice: Subject to any disclaimer, the term of this patent is extended or adjusted under 35 U.S.C. 154(b) by 256 days.

(21) Appl. No.: 18/594,491

(22) Filed: Mar. 4, 2024

(65) Prior Publication Data

US 2025/0279827 A1 Sep. 4, 2025

(51) Int. Cl.
*H04B 10/297* (2013.01)
*H04B 10/071* (2013.01)

(52) U.S. Cl.
CPC ......... *H04B 10/297* (2013.01); *H04B 10/071* (2013.01)

(58) Field of Classification Search
CPC ............................ H04B 10/297; H04B 10/071
See application file for complete search history.

(56) References Cited

U.S. PATENT DOCUMENTS

| | | | | |
|---|---|---|---|---|
| 6,212,000 | B1 * | 4/2001 | Ishikawa | H01S 3/10023 359/341.1 |
| 2002/0012142 | A1 * | 1/2002 | Gautheron | H04J 14/0279 398/79 |
| 2020/0127735 | A1 * | 4/2020 | Ait Sab | H04B 10/0777 |
| 2021/0021336 | A1 * | 1/2021 | Wang | H01S 3/094015 |
| 2022/0337313 | A1 * | 10/2022 | Aguirre | H04B 10/071 |
| 2022/0397448 | A1 | 12/2022 | Pilipetskii et al. | |
| 2024/0027259 | A1 | 1/2024 | Cai et al. | |

OTHER PUBLICATIONS

Extended European Search Report for EP Application No. 25160592.9, Dated Jul. 18, 2025, 9 pages.
Barnard, et al., "Bidirectional Fiber Amplifiers", IEEE Photonics Technology Letters, vol. 4, No. 8, XP000293633, Aug. 1, 1992, pp. 911-913.

* cited by examiner

*Primary Examiner* — Casey L Kretzer
(74) *Attorney, Agent, or Firm* — KDW Firm PLLC

(57) ABSTRACT

An apparatus and a method for transmission of optical signals. The apparatus includes a bidirectional amplification device communicatively coupled between a first communication terminal and a second communication terminal. The first and second communication terminals are communicatively coupled using an optical communication link. The bidirectional amplification device is configured to transmit and amplify one or more optical sensing signals transmitted in either direction between the first communication terminal and the second communication terminal. The optical sensing signals indicate a status of one or more portions of the optical communication link.

20 Claims, 8 Drawing Sheets

BIDIRECTIONAL LOOPBACK AMPLIFIER FOR OPTICAL SENSING APPLICATIONS

TECHNICAL FIELD

This disclosure relates generally to optical communication systems, and in particular to loopback bidirectional amplifiers for optical sensing applications.

BACKGROUND

Submarine optical cables are laid on the seabed or ocean floor between land-based terminals to carry optical signals across long stretches of ocean and sea. The optical cables typically include several optical fiber pairs and other components such as strengthening members, a power conductor, an electrical insulator, and a protective shield. The optical fibers may be single core/mode fibers or multi-mode/core fibers. The first fiber of a fiber pair may be coupled in the system for communicating signals in a first direction on the cable and the second fiber of the fiber pair may be configured for communicating signals in a second direction, opposite the first direction, on the cable to support bidirectional communications. Some existing systems employ various amplification devices to amplify sensing signals that may be reflected on the optical communication paths. The sensing signals may be indicative of various conditions on the paths, such as, for example, a break in the cable, an interference, a seismic event, etc. Conventional systems implement separate amplifiers to amplify sensing signals transmitted in counter direction, which add substantially structural and functional complexity and cost to the optical communication systems, as well as increases occurrences of signal loss, signal errors, and other undesirable issues.

SUMMARY

In some implementations, the current subject matter relates to an apparatus for transmission of optical signals. The apparatus may include a bidirectional amplification device communicatively coupled between a first communication terminal and a second communication terminal. The first and second communication terminals may be communicatively coupled using an optical communication link. The bidirectional amplification device may be configured to transmit and amplify one or more optical sensing signals transmitted in either direction between the first communication terminal and the second communication terminal. The optical sensing signals may indicate a status of one or more portions of the optical communication link.

In some implementations, the current subject matter may include one or more of the following optional features. The optical communication link may be configured to transmit one or more optical data signals.

In some implementations, the bidirectional amplification device may be configured to transmit a first optical sensing signal in one or more optical sensing signals in a first direction from the first communication terminal to the second communication terminal and amplify a first reflected optical sensing signal transmitted in a second direction from the second communication terminal to the first communication terminal. The device may also transmit a second optical sensing signal in one or more optical sensing signals in the second direction from the second communication terminal to the first communication terminal and amplify a second reflected optical sensing signal transmitted in the first direction from the first communication terminal to the second communication terminal.

In some implementations, the bidirectional amplification device may include an active gain medium optical component. The active gain medium optical component may be configured to amplify at least one of: the first reflected optical sensing signal, the second reflected optical sensing signal, the first optical sensing signal, the second optical sensing signal, and any combination thereof. The bidirectional amplification device may include at least one of: one or more isolators, one or more wavelength division multiplexing (WDM) optical components, one or more circulators, one or more bandpass filters, one or more optical couplers, and any combination thereof. One or more WDM optical components may be coupled to one or more pumps. One or more pumps may be laser pumps. One or more isolators may be configured to isolate one or more pumps from one or more optical signals being backscattered from the active gain medium optical component.

In some implementations, the active gain medium optical component may include at least one of the following: one or more erbium doped amplifiers, one or more doped fiber amplifiers, one or more Raman amplifiers, one or more semiconductor optical amplifiers, and any combination thereof.

In some implementations, the bidirectional amplification device may be communicatively coupled to one or more circulators. One or more circulators may be configured to direct transmission of at least one of: one or more optical sensing signals, one or more optical sensing signals amplified by the bidirectional amplification device, and any combination thereof, to the bidirectional amplification device and/or away from the bidirectional amplification device.

In some implementations, the current subject matter relates to a method for transmission of optical signals. The method may include providing a bidirectional amplification device communicatively coupled between a first communication terminal and a second communication terminal, where the first and second communication terminals may be communicatively coupled using an optical communication link; amplifying, using the bidirectional amplification device, one or more optical sensing signals transmitted in either direction between the first communication terminal and the second communication terminal, where one or more optical sensing signals may indicate a status of one or more portions of the optical communication link; and transmitting, using the bidirectional amplification device, one or more optical sensing signals amplified by the bidirectional amplification device. The optical communication link may be configured to transmit one or more optical data signals.

In some implementations, the method may also include transmitting, using the bidirectional amplification device, a first optical sensing signal in one or more optical sensing signals in a first direction from the first communication terminal to the second communication terminal and amplifying a first reflected optical sensing signal transmitted in a second direction from the second communication terminal to the first communication terminal. The method may further include transmitting, using the bidirectional amplification device, a second optical sensing signal in one or more optical sensing signals in the second direction from the second communication terminal to the first communication terminal and amplifying a second reflected optical sensing signal transmitted in the first direction from the first communication terminal to the second communication terminal.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
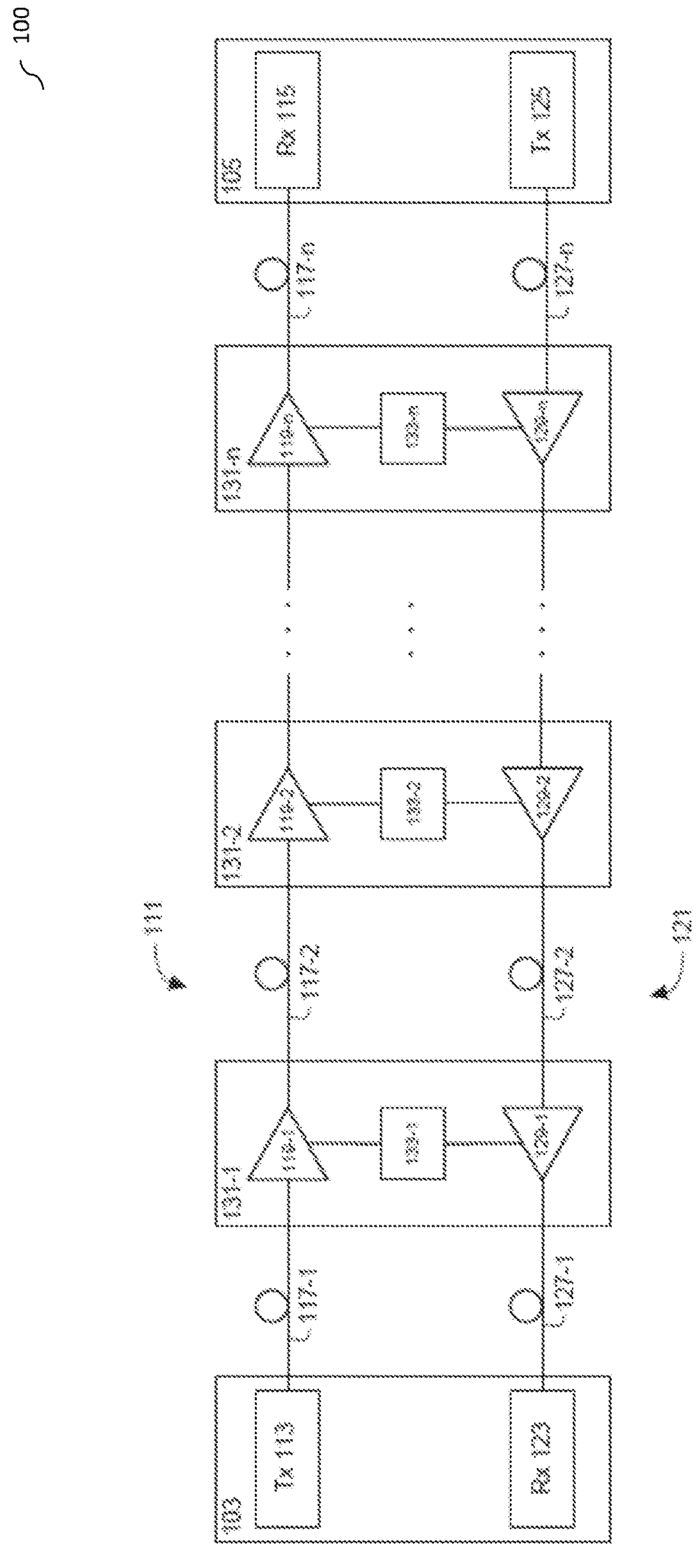
FIG. 1 illustrates an exemplary optical communication system.

To address these and potentially other deficiencies of currently available solutions, one or more implementations of the current subject matter relate to methods, systems, articles of manufacture, and the like that can, among other possible advantages, provide loopback bidirectional amplifiers for optical sensing applications.

In some implementations, the current subject matter relates to an optical communication system that may be configured to provide bidirectional amplification to optical sensing signals that may be transmitted on outbound and/or inbound communication paths communicatively coupling one or more transmitters (and/or transceivers) to one or more receivers (and/or transceivers). The system may include a bidirectional amplification device that may be communicatively coupled between a first communication terminal and a second communication terminal. The first and second communication terminals may be communicatively coupled using an optical communication link. The communication terminals may include transmitting and/or receiving components and/or both that may be capable of transmission and receiving of various optical sensing signals (e.g., optical signals used to detect conditions of the optical communication link) and/or optical data signals (e.g., optical signals that may be used for transmission of data, information, etc.). The bidirectional amplification device may be configured to transmit and amplify one or more optical sensing signals transmitted in either direction between the first communication terminal and the second communication terminal.

In some implementations, the bidirectional amplification device may be configured to transmit a first optical sensing signal in a first direction (e.g., from the first communication terminal to the second communication terminal) and amplify a first reflected optical sensing signal transmitted in a second direction (e.g., from the second communication terminal to the first communication terminal). The first reflected optical sensing signal may be an optical signal that may be reflected on the optical communication link in response to detecting a condition on the link (e.g., a cable break, an interference, a seismic event, etc.). The first reflected optical sensing signal may be a reflection of the first optical sensing signal and/or any other signal.

In some implementations, the bidirectional amplification device may also transmit a second optical sensing signal in the second direction from the second communication terminal to the first communication terminal. It may also amplify a second reflected optical sensing signal transmitted in the first direction from the first communication terminal to the second communication terminal. The second reflected optical sensing signal may be a reflection of the second optical sensing signal and/or any other signal. It may also be an optical signal that may be reflected on the optical communication link in response to detecting a condition on the link.

To amplify optical sensing signals, the bidirectional amplification device may include an active gain medium optical component. The active gain medium optical component may be configured to amplify at least one of: the first reflected optical sensing signal, the second reflected optical sensing signal, the first optical sensing signal, the second optical sensing signal, and any combination thereof. The bidirectional amplification device may further include at least one of: one or more isolators, one or more wavelength division multiplexing (WDM) optical components, and any combination thereof. The WDM optical components may be coupled to one or more pumps, where the pumps may be laser pumps. Moreover, the isolators may be configured to isolate one or more pumps from one or more optical signals being backscattered from the active gain medium optical component. Further, the active gain medium optical component may include at least one of the following: one or more doped fiber amplifier, one or more Erbium fiber amplifier one or more Raman amplifiers, one or more semiconductor optical amplifiers, and any combination thereof.

In some implementations, the bidirectional amplification device may be communicatively coupled to one or more circulators. The circulators may be configured to direct transmission of at least one of: one or more optical sensing signals, one or more optical sensing signals amplified by the bidirectional amplification device, and any combination thereof. The circulators may direct such signals towards the bidirectional amplification device and/or away from the bidirectional amplification device.

FIG. 1 illustrates an exemplary optical communication system 100. The system 100 may use high-bandwidth fiber optics to transmit/receive vast amounts of data over long distances. The bidirectional optical communication system 100 may also be referred to as a long-haul optical communication system. Bidirectional data transmission may be implemented by constructing pairs of optical fibers within an optical cable and/or transmitting one or more channels, e.g., wavelength division multiplexed channels, per fiber pair.

The system 100 may include terminals 103 and 105 communicatively coupled using (e.g., unidirectional) optical paths 111, 121. The terminal 103 may include a transmitter 113 and a receiver 123. Likewise, the terminal 105 may include a receiver 115 and a transmitter 125. The transmitter 113 of the terminal 103 may be communicatively coupled to the receiver 115 of the terminal 105 via the path 111. The transmitter 125 of the terminal 105 may be communicatively coupled to the receiver 123 of the terminal 103 via the communication path 121. The paths 111, 121 may form a bidirectional optical fiber pair. For example, the optical path 111 may transmit signal(s), data, information, etc. and/or any combination thereof in one direction, e.g., from the transmitter 113 to the receiver 115. Optical path 121 may transmit signal(s), data, information, etc. and/or any combination thereof in another direction, e.g., from the transmitter 125 to the receiver 123.

Thus, with respect to the terminal 103, the optical path 111 may be referred to as an outbound path and the optical path 121 may be referred to as an inbound path. The optical path 111 may include one or more optical fibers 117-1 to **117-*n* and one or more optical amplifiers 119-1 to 119-*n*, the latter being positioned within respective repeaters 131-1 to 131-*n*. Similarly, the optical path 121 may include one or more optical fibers 127-1 to 127-*n* and one or more optical amplifiers 129-1 to 129-*n*, the latter being positioned within the respective repeaters 131-1 to 131-*n*. The optical fibers 117-1 to 117-*n* and 127-1 to 127-2 may be individual segments of a single optical fiber 117 and/or a single optical fiber 127, respectively, where the segments may be formed by way of coupling of the amplifiers to the optical fibers 117 and 127, as shown in FIG. 1**.

For example, one or more optical amplifiers 119-1 to **119-*n* and/or 129-1 to 129-*n* may be Erbium-doped fiber amplifiers (EDFAs), and/or any other optical amplifiers. Further, while transmitters 113, 115 and receivers 123, 125 are shown as separate components, as can be understood, transmitter 113 and/or receiver 123 may be housed together in a single housing and may form a transponder and/or transceiver at the terminal 103. Similarly, transmitter 115 and receiver 125 may also be housed together in a single housing and may form a transponder and/or transceiver at terminal 105**.

As stated above, the optical path pair (e.g., optical paths 111, 121) may be configured as a set of amplifier pairs 119-1 to **119-*n* and 129-1 to 129-*n* within repeaters 131-1 to 131-*n* communicatively coupled thereto using pairs of optical fibers 117 (e.g., using optical fibers 117-1 to 117-*n*) and 127 (e.g., using optical fibers 127-1 to 127-*n*), which may be included in an optical fiber cable together with other fibers and/or fiber pairs supporting additional path pairs. As discussed above and shown in FIG. 1, for example, each repeater 131-1 to 131-*n* may include at least a pair of respective amplifiers 119-1 to 119-*n*, 129-1 to 129-*n* for each path pair and/or may include additional amplifiers for additional path pairs. As shown in FIG. 1, for example, the repeater 131-1 may include amplifiers 119-1 and 129-1**.

The optical amplifiers 119-1 to **119-*n*, 129-1 to 129-*n* may include EDFAs and/or other rare earth doped fiber amplifiers, Raman amplifiers, semiconductor optical amplifiers (SOAs), and/or any other types of amplifiers. Each repeater 131-1 to 131-*n* may also include respective coupling paths 133-1 to 133-*n* that may be communicatively coupled between optical paths 111, 121**. It may be understood that the term "couple" and/or "coupled" and/or "communicatively coupled", as used herein, may broadly refer to any connection, connecting, coupling, link, and/or linking, direct and/or indirect and/or wired and/or wireless connection, etc. but does not necessarily imply that the coupled components and/or elements are directly connected to each other.

Subsea optical fiber cables transmit and receive multi terabit optical traffic. Sensing applications may use deployed optical fibers for intrusion detections, cable cuts and faults, minimizing restoration efforts. The optical data traffic flows bidirectionally within these networks. Sensing applications that may complement and may be configured to monitor each span bidirectionally. The Rayleigh scattered back reflected sensing signal may require amplification to regenerate power and transmit back to sensing receivers. Existing system typically require two different optical amplifiers to amplify sensing signal(s) from opposite spans and propagate them towards the receiver.

In some implementations, the current subject matter provides a bidirectional optical fiber amplifier for multi-span subsea optical network sensing. The bidirectional loopback amplifier may be configured to amplify reflected sensing signals wavelengths propagating from opposite spans.

Figure 2:
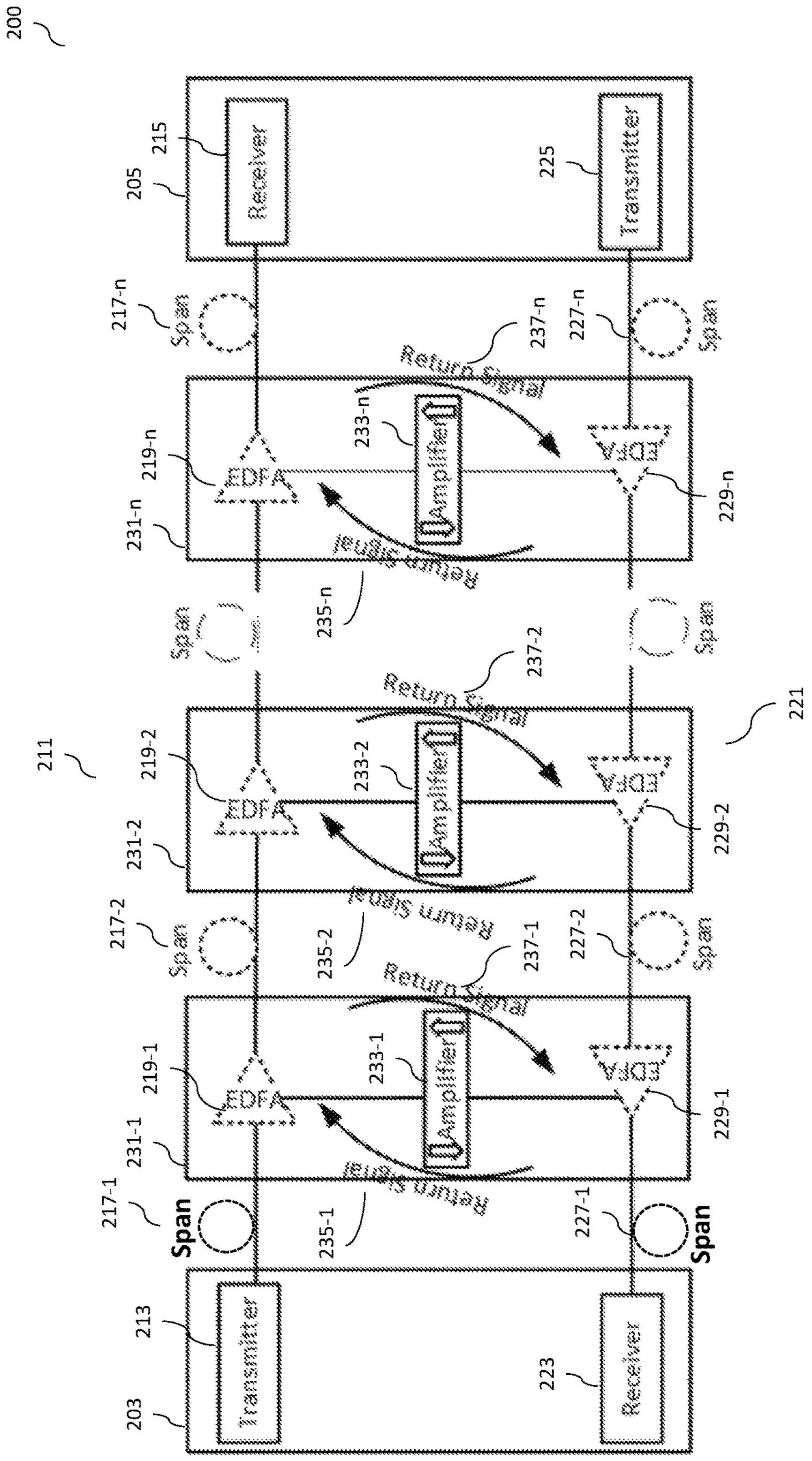
FIG. 2 illustrates an example of a bidirectional optical sensing system for bidirectionally amplifying optical sensing signals, according to some implementations of the current subject matter.

FIG. 2 illustrates an example of a bidirectional optical sensing system 200 for bidirectionally amplifying optical sensing signals, according to some implementations of the current subject matter. The system 200 may include terminals 203 and 205 communicatively coupled using (e.g., unidirectional) optical paths 211, 221, where terminals 203 and 205 may include respective transmitters 213, 215 and respective receivers 223, 225. Transmitter 213 and receiver 215 may be communicatively coupled using optical communication path 211 and transmitter 225 and receiver 223 may be communicatively coupled using optical communication path 221. The optical paths 211, 221 may transmit signal(s), data, information, etc. and/or any combination thereof in one direction (e.g., path 211: from transmitter 213 to the receiver 215; and path 221: from the transmitter 225 to the receiver 223).

One or more repeaters 231-1 to **231-*n* may be positioned across the optical paths 211 and 221. The repeaters 231 may include respective amplifiers (e.g., Erbium-doped fiber amplifier (EDFA)) 219-1 to 219-*n* and 229-1 to 229-*n* for amplifying optical signals transmitted on the paths 211, 221. For example, repeater 231-1 may include EDFA 219-1 for amplifying signals transmitted on optical communication path 217-1; repeater 231-2 may include EDFA 219-2 for amplifying signals transmitted on optical communication path 217-2; etc. Further, repeater 231-1 may include EDFA 229-1 for amplifying signals transmitted on optical communication path 227-1; repeater 231-2 may include EDFA 229-2 for amplifying signals transmitted on optical communication path 227-2**; etc.

Moreover, the repeaters 231 may also include respective optical sensing signal amplifiers 233-1 to **233-*n* (e.g., repeater 231-1 may include amplifier 233-1; etc.). The amplifiers 233 may be configured as bidirectional amplifiers and may be configured to amplify reflected or returned respective optical sensing signals 235. For example, the repeater 231-1 may include amplifier 233-1 that may be configured to amplify a reflected signal 237-1 that may be reflected back in response to an optical sensing signal sent from the transmitter 213 toward the receiver 215 and/or as a result of an event and/or condition (e.g., a break, a damage, an interference, etc. on the optical communication path) detected on the optical communication path 217-2 (e.g., due to Rayleigh scattering of fiber, etc.). The sensing optical signal may be transmitted (in either direction) on the optical communication path that is used for transmission of optical data signals and/or on a separate optical communication path that is dedicated to the transmission of optical sensing signals. The optical sensing signals may be transmitted using the same transmitter (e.g., transmitter 213) that transmits optical data signals and/or using a separate optical sensing signal transmitter. Similarly, the amplifier 233-1 that may be configured to amplify a reflected signal 235-1 that may be reflected back in response to an optical sensing signal sent from the transmitter 225 toward the receiver 223 and/or as a result of an event and/or condition detected on the optical communication path 227-1 (e.g., due to Rayleigh scattering of fiber, etc.). As discussed herein, the amplifiers 233** may be configured to bidirectionally amplify reflected/returned optical sensing signals in both directions, thereby obviating a need to have separate amplifiers and, hence, reducing an amount of hardware, power, etc. that may be needed. In some implementations, the current subject matter may monitor (e.g., continuously, periodically, etc.) any and/or all reflected signals. One or more (or none) of such signals may be amplified (e.g., by one or more amplifiers discussed herein) for transmission. Any changes in such signals may correspond to changes in the reflected signal phase, amplitude, polarization, and/or any other signal parameters, and/or any combination of parameters.

For example, one or more optical amplifiers 219-1 to **219-*n* and/or 229-1 to 229-*n* may be Erbium-doped fiber amplifiers (EDFAs), other rare earth doped fiber amplifiers, Raman amplifiers, semiconductor optical amplifiers (SOAs), and/or any other optical amplifiers. Further, while transmitters 213, 215 and receivers 223, 225 are shown as separate components, as can be understood, transmitter 213 and/or receiver 223 may be housed together in a single housing and may form a transponder and/or transceiver at the terminal 203. Similarly, transmitter 215 and receiver 225 may also be housed together in a single housing and may form a transponder and/or transceiver at terminal 205**.

Moreover, as shown in FIG. 2, optical paths 211, 221 may be configured as a set of respective amplifier pairs 219 and 229 within respective repeaters 231 communicatively coupled using respective pairs of optical fibers 217 and 227. The optical fibers 217, 227 may be included in an optical fiber cable together with other fibers and/or fiber pairs supporting additional path pairs.

Figure 3:
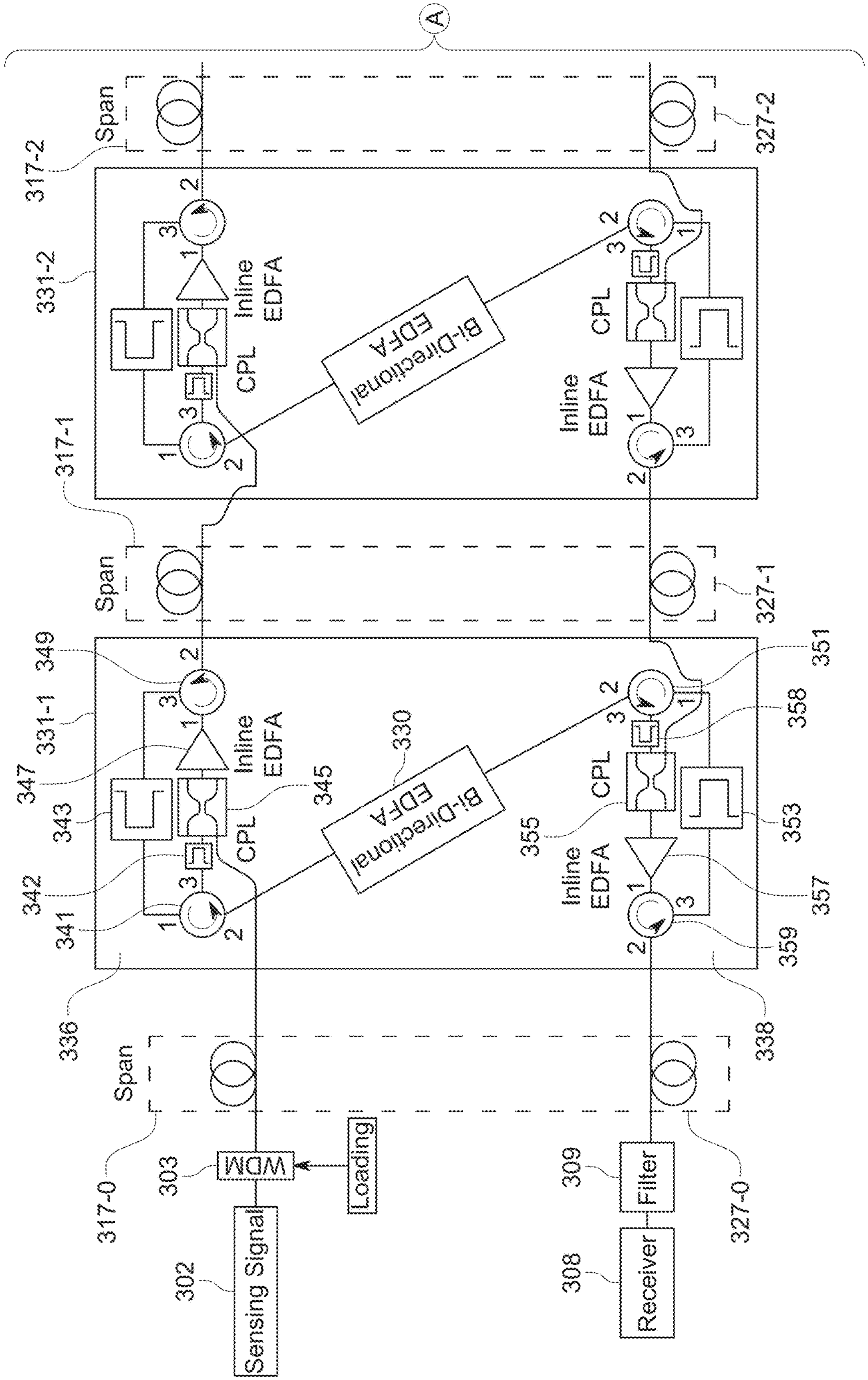
FIG. 3 illustrates an example of a bidirectional optical sensing system for bidirectionally amplifying optical sensing signals, according to some implementations of the current subject matter.
Figure 3:
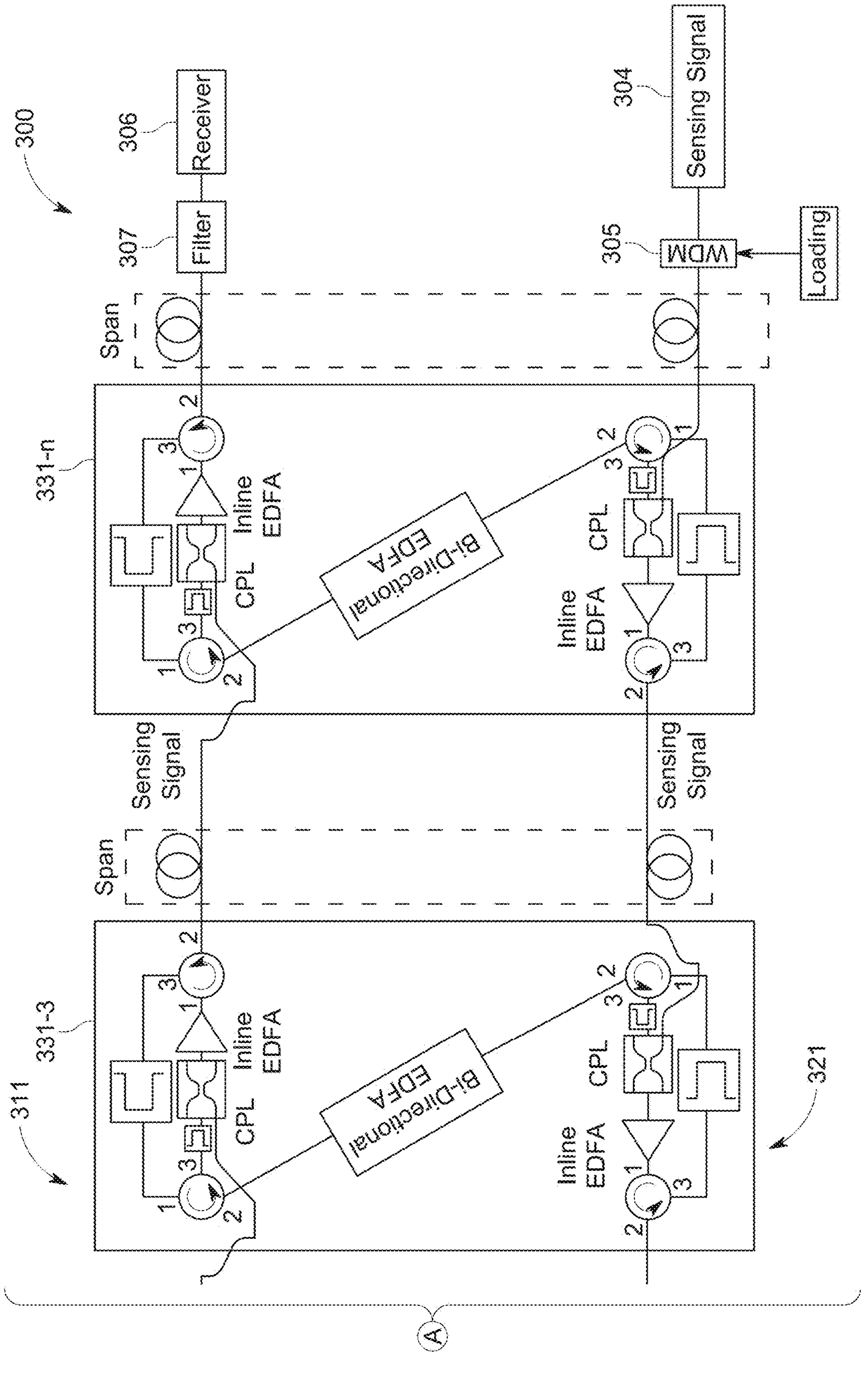

FIG. 3 illustrates an example of a bidirectional optical sensing system 300 for bidirectionally amplifying optical sensing signals, according to some implementations of the current subject matter. The system 300 may be part of the system 200 shown in FIG. 2. The system 300 may include one or more repeaters 331-1, 331-2, . . . , **331-*n* that may be communicatively coupled using optical communication path spans 317 (317-0, 317-1, 317-2, . . . , 317-*n*) and 327 (327-0, 327-1, 327-2, . . . 327-*n*). The path 317 may be configured for transmission of optical sensing signals between a source of the sensing signal 302 (via wavelength division multiplexer (WDM) 303) to the receiver 306 (via a filter 307) and the path 327 may be configured for transmission of optical sensing signals between a source of the sensing signal 304 (via WDM 305) to the receiver 308 (via a filter 309). The sensing signal 302 may be transmitted to determine status of the optical transmission path 211 shown in FIG. 2 (shown as 311 in FIG. 3) and/or one or more of the spans 317. The sensing signal 304 may be transmitted to determine status of the optical transmission path 221 shown in FIG. 2 (shown as 321 in FIG. 3) and/or one or more of the spans 327**. As can be understood, a single source or multiple sources of sensing signals may be used for transmission of sensing signals.

The repeaters 331 may be the repeaters 231 and/or may be incorporated into the repeaters 231 shown in FIG. 2. Each of the repeaters 331 may have similar or same structure and/or function(s). Thus, for ease of illustration and description, the following discussion will be presented with regard to repeater 331-1, but as can be understood, it is applicable to the remaining repeaters 331-2, . . . **331-*n***.

The repeater 331-1 may include one or more sensing signal branches 336 and 338 communicatively coupled to one another via a bidirectional optical amplification device 330. The branch 336 may be configured for transmission and processing of the sensing signal 302 as well as reflected optical sensing signals on optical communication paths 317, which may be reflected in response to the sensing signal 302 encountering a reflecting point (e.g., an interference, a break, a damage, and/or any other reflective event) in one or more of the optical communication paths 317) (e.g., due to Rayleigh scattering of fiber, etc.). As stated above, the reflected signal(s) may be monitored (e.g., continuously, periodically, etc.), with one or more (or none) of such signals amplified (e.g., by one or more amplifiers discussed herein). Reflected signal(s)'s phase, amplitude, polarization, and/or any other signal parameters, and/or any combination of parameters may be ascertained to determine any changes in the reflected signals. The branch 338 may be configured for transmission and processing of the sensing signal 304 as well as reflected optical sensing signals on optical communication paths 327, which may be reflected in response to the sensing signal 304 encountering a reflecting point (e.g., an interference, a break, a damage, and/or any other reflective event) in one or more of the optical communication paths 327).

The branch 336 may include circulators 341, 349, bandpass filters 342, 343, a coupler (e.g., a WDM) 345, and an inline EDFA amplifier 347. Each of the circulators 341, 349 may include one or more ports (labeled "1", "2", and "3") that may be configured for passing optical sensing signals and/or reflected optical sensing signals to optical communication components that may be coupled to them. In particular, on port 1, the circulator 341 may be communicatively coupled to the bandpass filter 343; on port 2, the circulator 341 may be communicatively coupled to the bidirectional amplification device 330, and on port 3, the circulator 341 may be communicatively coupled to the filter 342, which, in turn, may be communicatively coupled to the coupler 345. The coupler 345 may be configured to receive optical sensing signal 302, via the span or optical communication path 317-0 and may further be communicatively coupled to an input of the EDFA 347. The output of the EDFA 347 may be communicatively coupled to port 1 of the circulator 349. Port 2 of the circulator 349 may be communicatively coupled to optical communication path 317-1 and may be configured for receiving reflected optical sensing signals transmitted on the path 317-1 toward the repeater 331-1. Port 3 of the circulator 349 may be communicatively coupled to the bandpass filter 343. The circulators 341, 349 may be configured to direct transmission of optical sensing signals in a counterclockwise fashion. As can be understood, circulators 341, 349 may arranged and configured to direct transmission of optical sensing signals in any desired direction.

Similarly, the branch 338 may include circulators 351, 359, bandpass filters 353, 358, a coupler (e.g., WDM) 355, and an inline EDFA amplifier 357. The branch 338 may be configured to receive signals from the source 304 and pass them to the receiver 309. It may also be configured to receive reflected signals and passing them onto branch 336 for transmission to the receiver 306. Each of the circulators 351, 359 may include one or more ports (labeled "1", "2", and "3") that may be configured for passing optical sensing signals and/or reflected optical sensing signals to optical communication components that may be coupled to them. In particular, on port 1, the circulator 351 may be communicatively coupled to the bandpass filter 353. On port 2, the circulator 351 may be communicatively coupled to the bidirectional amplification device 330. On port 3, the circulator 351 may be communicatively coupled to the bandpass filter 358, which in turn may be communicatively coupled to the coupler 355. The coupler 355 may be configured to receive optical sensing signal 304. It may also be communicatively coupled to an input of the EDFA 357. The output of the EDFA 357 may be communicatively coupled to port 1 of the circulator 359. Port 2 of the circulator 359 may be communicatively coupled to optical communication path 327-0 and may be configured for receiving reflected optical sensing signals transmitted on the path 327-1 toward the repeater 331-1. Port 3 of the circulator 359 may be communicatively coupled to the bandpass filter 353. The circulators 351, 359 may be configured to direct transmission of optical sensing signals in a counterclockwise fashion. As can be understood, circulators 351, 359 may arranged and configured to direct transmission of optical sensing signals in any desired direction.

During transmission of optical sensing signals (e.g., to determine status of the optical communication paths (e.g., optical sensing paths and/or optical data paths), the optical sensing signal 302 may be transmitted to the repeater 331-1, via the communication path 317-0, and received by the coupler 345. The coupler 345 may then transmit this sensing signal to the EDFA 347, which may amplify the signal and transmit it to port 1 of the circulator 349. The circulator 349 may then direct the amplified sensing signal to port 2 and pass it along as output to the optical communication path 317-1. The signal may then be received by the coupler (similar to coupler 345) of the repeater 331-2.

Upon encountering a reflecting event (e.g., an interruption, a break, a seismic event, etc.) on one of the optical communication paths, e.g., path 317-1, the sensing signal may be reflected back toward the repeater 331-1. As discussed above, the reflected signal(s) may be continuously monitored (e.g., regardless of any events and/or encountering of events). The reflected optical signal may be received on port 2 of the circulator 349. The circulator 349 may then direct transmission of the reflected sensing signal to its port 3, which, in turn, may be passed to the bandpass filter 343. The bandpass filter 343 may remove noise and/or limiting bandwidth of the reflected sensing signal, and/or perform any other signal processing functions. The processed reflected sensing signal may then be received on port 1 of the circulator 341. The circulator 341 may then direct the reflected sensing signal to the bidirectional amplification device 330 via its port 2. The amplification device 330 may amplify the reflected sensing signal and transmit it to port 2 of the circulator 351.

The circulator 351 may then direct the amplified reflected sensing signal to its port 3 and, via the bandpass filter 358 (which may remove noise, and/or limiting bandwidth of the reflected sensing signal, etc.) to the coupler 355. The coupler 355 may provide this signal to the EDFA 357. The EDFA 357 may further amplify the amplified reflected sensing signal. Such signal may then be transmitted toward receiver 309 via the circulator 359 (from its port 1 to port 2) and communication path 327-0, which eventually may be received by the receiver 309.

Processing of sensing signal 304 and any of its reflected signals is similar to the processing of sensing signal 302. In particular, the optical sensing signal 304 may be transmitted to the repeater 331-1 and received by the coupler 355. The coupler 355 may then transmit this sensing signal to the EDFA 357. The EDFA 357 may amplify the signal and transmit it to port 1 of the circulator 359, which may direct the amplified sensing signal to port 2 and pass it along as output to the optical communication path 327-0, and then may be received by the receiver 309.

Any reflected optical sensing signals on path(s) 327, may be received on port 2 of the circulator 359, e.g., from communication path 327-0 (and/or in case of repeater 331-2, for example, communication path 327-1, etc.), which may direct transmission of the reflected sensing signal to its port 3 and pass it to the bandpass filter 353 for processing. The processed reflected sensing signal may be received on port 1 of the circulator 351, which may direct the reflected sensing signal to the bidirectional amplification device 330 via its port 2. The amplification device 330 may amplify the reflected sensing signal and transmit it to port 2 of the circulator 341.

The circulator 341 may then direct the amplified reflected sensing signal to its port 3 and, via the bandpass filter 342, to the coupler 345. The bandpass filter 342 (and similarly the bandpass filter 358) may be configured to filter noise, and/or limiting bandwidth of the reflected sensing signal, etc.) The coupler 345 may provide this signal to the EDFA 347. The EDFA 347 may also amplify the amplified reflected sensing signal. The signal may then be transmitted toward receiver 306 via the circulator 349 (from its port 1 to port 2) and communication paths 317. As can be understood, this signal may be further amplified by EDFAs (e.g., similar to EDFA 347 of repeater 331-1) of one or more of the repeaters 331.

Figure 4A:
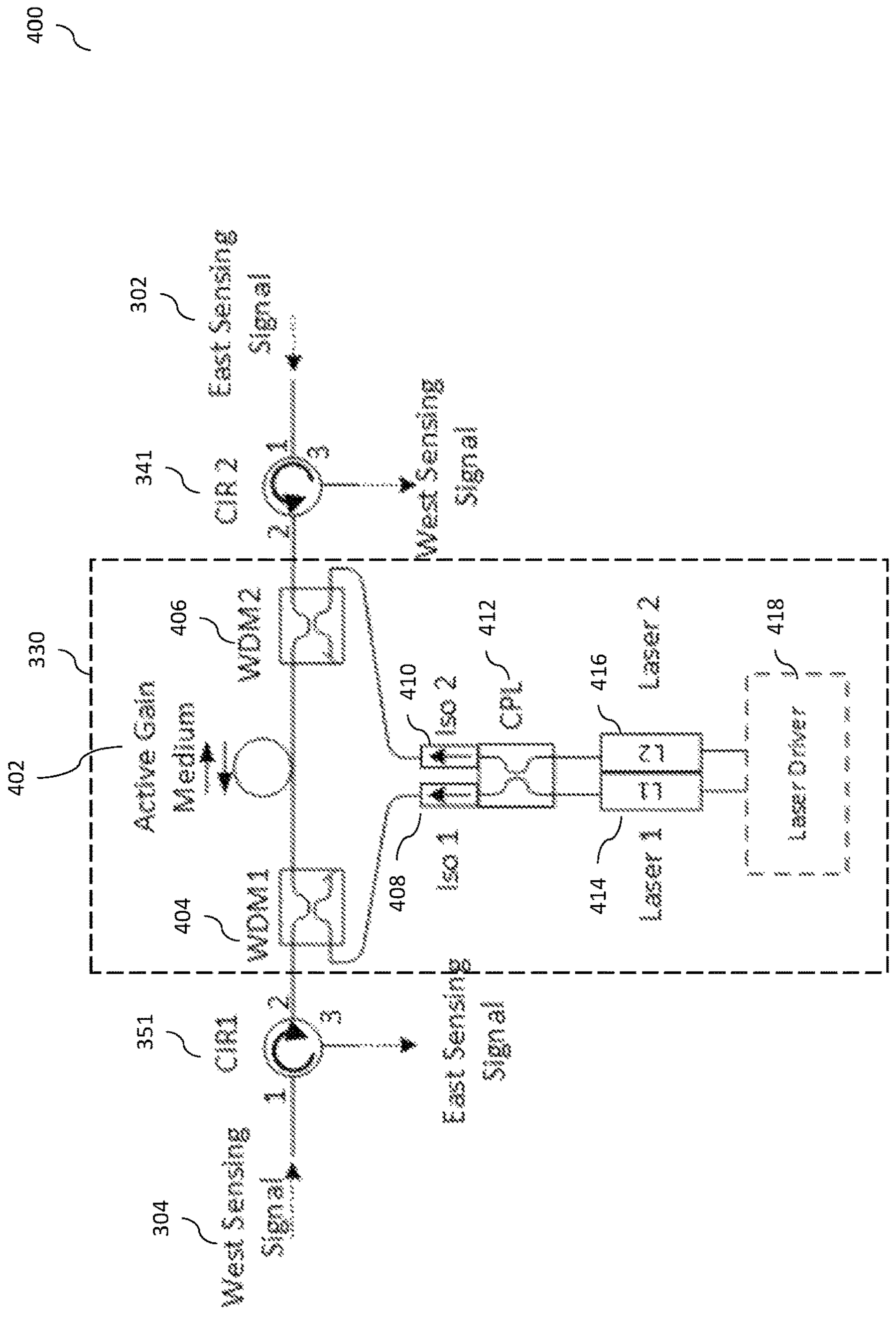
FIG. 4A illustrates an example of a bidirectional amplification system, according to some implementations of the current subject matter.

FIG. 4A illustrates an example of a bidirectional amplification system 400, according to some implementations of the current subject matter. One or more components of and/or the entire system 400 may be included and/or incorporated into one or more repeaters 331 shown in FIG. 3. The system 400 may be used for bidirectional amplification of optical sensing signals, such as, for example, optical sensing signals that may be reflected upon encountering of a reflective event in response to optical sensing signals that may be transmitted from either source of the optical sensing signals (e.g., sources 302 and/or 304 as shown in FIG. 3) and/or performing continuous monitoring of reflected signals (irrespective of any events or conditions).

The system 400 may include the bidirectional optical amplification device 330 (as shown in FIG. 3) that may be communicatively coupled to circulators 351 and 341. The circulator 351 may be configured to receive the reflected optical sensing signal 304 (e.g., "west sensing signal") and direct/re-direct transmission of the reflected optical sensing signal (as reflected in the opposite direction to the direction of the optical sensing signal 304) to the east sensing receiver 306 (as shown in FIG. 3). Similarly, the circulator 341 may be configured to receive the reflected optical sensing signal 302 (e.g., "east sensing signal") and direct/re-direct transmission of the reflected optical sensing signal (as reflected in the opposite direction to the direction of the optical sensing signal 302) to the west sensing receiver 308 (as shown in FIG. 3). As can be understood, designations of "east" and "west" are provided here for illustrative purposes only and are not intended to limit the scope of the current subject matter.

The bidirectional optical amplification device 330 may include an active gain medium 402 that may be communicatively coupled between WDM1 404 and WDM2 406. The WDM1 404 may be communicatively coupled to the circulator 351 and to an isolator ("Iso 1") 408. The WDM2 406 may be communicatively coupled to the circulator 341 and to an isolator ("Iso 2") 410. The isolators 408 and 410 may be coupled to a coupler 412, which may, in turn, may be communicatively coupled to lasers L1 414 ("Laser 1") and L2 416 ("Laser 2"). The lasers 414 and 416 may be coupled to a laser driver 418. The lasers 414, 416 may be pump lasers that may be driven by the common laser driver 418 and may be coupled together using the coupler 412, which may be a fused fiber coupler and/or any other type of coupler. The isolators 408, 410 may be configured to protect the lasers 414, 416 from high-power back-reflection and/or high pump power passing through active gain medium 402.

In operation, the reflected optical sensing signals 304 may be configured to be routed by the circulator 351 from its port 1 to port 2 and transmitted to the WDM1 404, which may multiplex, using one or more lasers 414, 416, one or more reflected optical sensing signals 304 that may be co-propagating in either direction (e.g., east to west or west to east). The multiplexed optical sensing signals may be provided to the active gain medium 402 for amplification. The active gain medium 402 may include rare earth doped fiber amplifiers, Raman amplifiers, semiconductor optical amplifiers (SOAs), and/or any other optical amplifiers, which may be configured to amplify multiplexed optical signals prior to passing them through WDM2 406. The output of the WDM2 406 may be transmitted to the circulator 341 and received at its port 2. The circulator 341 may then direct these signals to port 3 for transmission to the receiver 308 (e.g., "west sensing signals").

Similarly, the reflected optical sensing signals 302 may be routed by the circulator 341 from port 1 to port 2 and passed on to WDM2 406. WDM2 406 may multiplex these optical sensing signals using one or more pump lasers 414, 416. The signals may likewise be co-propagating in either direction (e.g., east to west or west to east). The multiplexed optical sensing signals may be amplified using the active gain medium 402 and passed to WDM1 404. The WDM1 404 may transmit the amplified signals to port 2 of the circulator 351. The circulator 351 may then direct these signals to its port 3 and transmit them toward the receiver 306 (e.g., "east sensing signals").

In some implementations, a single laser (either 414 or 416) may be used to pump WDM1 404 and WDM2 406. Alternatively, or in addition, each WDM may be operable by a specific laser 414, 416 and/or by either laser.

Figure 4B:
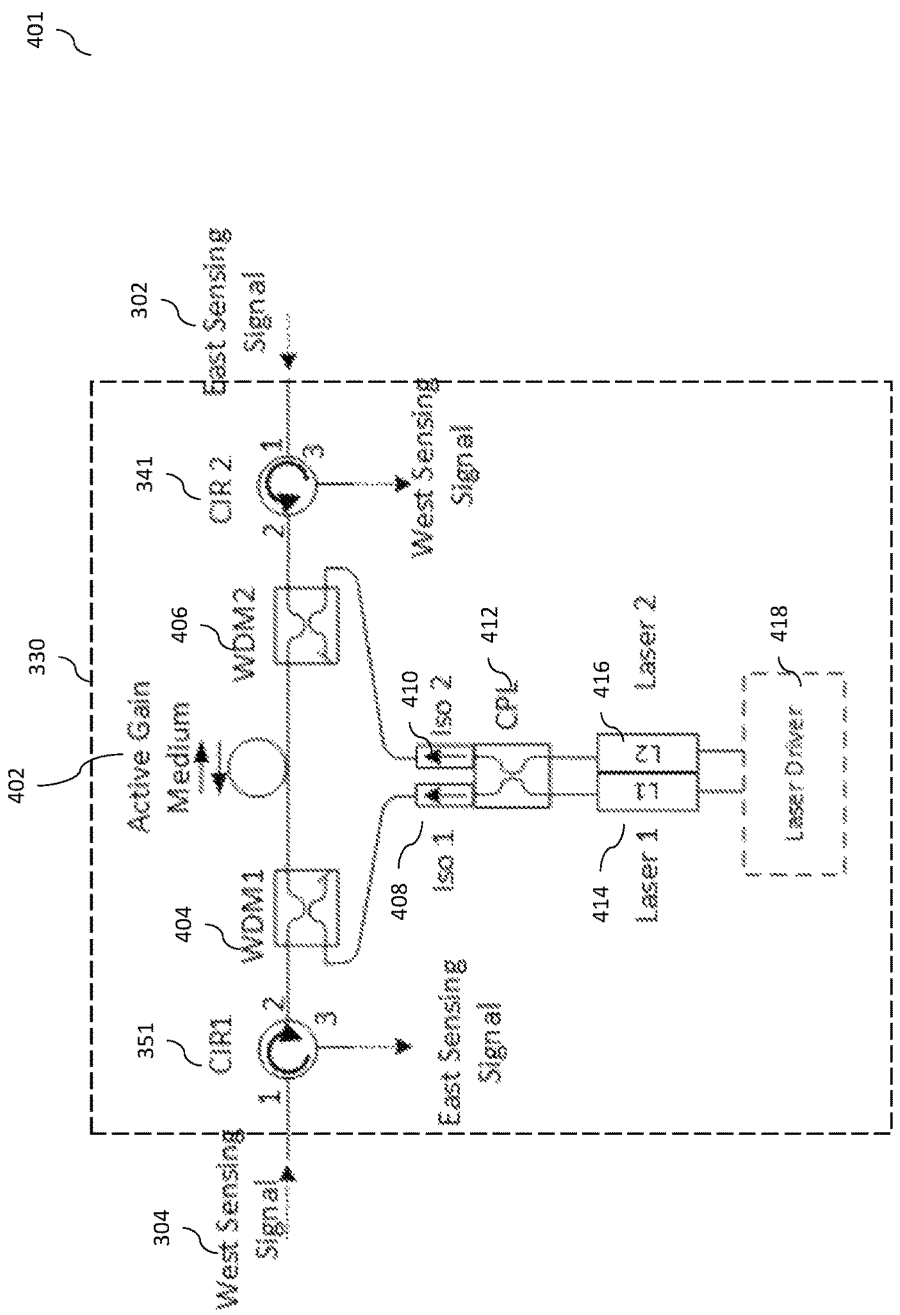
FIG. 4B illustrates another example of a bidirectional amplification system, according to some implementations of the current subject matter.

In some implementations, the bidirectional optical amplification device 330, in addition to including components shown in FIG. 4A, may be configured to include circulators 341 and 351, as shown by the system 401 in FIG. 4B. Thus, instead of circulators 341 and 351 being communicatively coupled to the bidirectional optical amplification device 330 in FIG. 4A (via respective WDM2 406 and WDM1 404), the circulators 341 and 351 may form part of the bidirectional optical amplification device 330 in FIG. 4B. The connections of the circulators 341, 351 to components within the bidirectional optical amplification device 330 as well as outside of the bidirectional optical amplification device 330 are similar to the those discussed above with regard to FIG. 4A. Likewise, the operation (e.g., optical signal processing) of the bidirectional optical amplification device 330, including circulators 341, 351, may be similar to the operation of the components in the system 400 shown in FIG. 4A.

Figure 5:
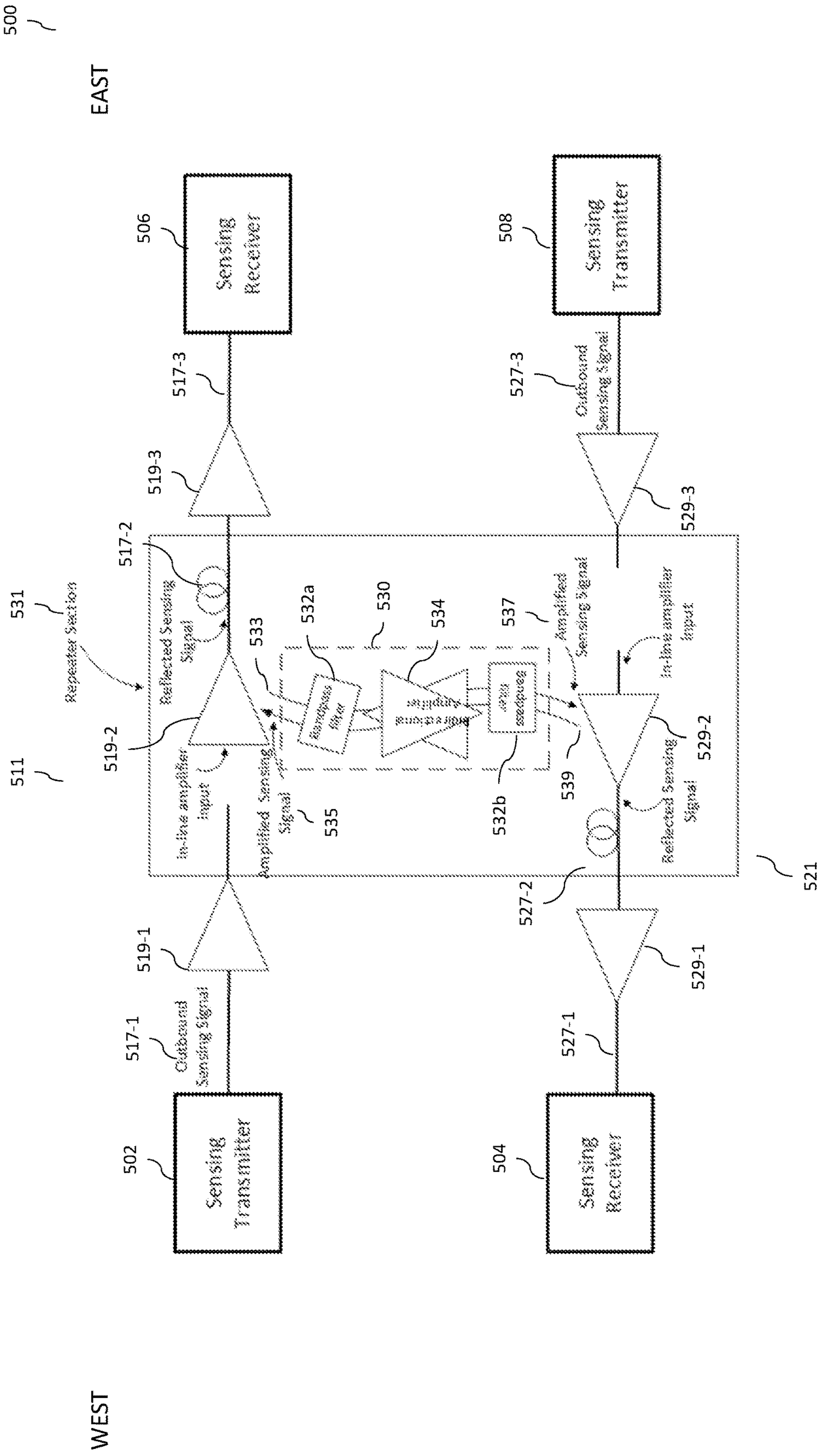
FIG. 5 illustrates an example of an optical communication system that may be configured to perform bidirectional amplification of optical sensing signals, according to some implementations of the current subject matter.

FIG. 5 illustrates an example of an optical communication system 500 that may be configured to perform bidirectional amplification of optical sensing signals, according to some implementations of the current subject matter. The system 500 may be similar to the systems discussed in connection with FIGS. 1-4B above.

The system 500 may include a west-side sensing transmitter 502 configured to transmit one or more optical sensing signals to east-side sensing receiver 506, and an east-side sensing transmitter 508 configured to transmit one or more optical sensing signals to west-side sensing receiver 504. The transmitter 502 and receiver 506 may be communicatively coupled using an optical communication path 511 that may be configured to transmit one or more optical sensing signals and/or one or more optical data signals. The communication path 511 may include one or more repeaters (e.g., repeater(s) 531) that may be positioned across it (e.g., at every predetermined distance (e.g., 50 km, 100 km, etc.)), which may include one or more amplifiers (e.g., EDFA, etc.) 519-1, 519-2, 519-3, etc. (for simplicity, only three amplifiers are shown in FIG. 5) to amplify optical signals transmitted on spans or portions 517-1, 517-2, 517-3, etc. of the communication path 511. Similarly, the communication path 521 may include one or more repeaters (e.g., repeater(s) 531) that may be positioned across it (e.g., at every predetermined distance (e.g., 50 km, 100 km, etc.)), which may include one or more amplifiers (e.g., EDFA, etc.) 529-1, 529-2, 529-3, etc. (again, for simplicity, only three amplifiers are shown in FIG. 5) to amplify optical signals transmitted on spans or portions 527-1, 527-2, 527-3, etc. Further, the same repeater housing (e.g., housing of the repeater 531) may be positioned across both communication paths 511 and 521. As can be understood, respective amplifiers 519 (e.g., 519-1) and 529 (e.g., 529-1) may be included in the same respective repeater housing 531 (e.g., as shown in FIGS. 1-3) and/or separate housings, which may form a repeater. As shown in FIG. 5, the housing for the repeater 531 may include amplifier 519-2 positioned on the communication line 511 and amplifier 529-2 positioned on the communication line 521. Moreover, transmitter 502 and receiver 504 may likewise be positioned in a common housing. Similarly, a common housing may be used to house receiver 506 and transmitter 508. Alternatively, or in addition, transmitters and receivers on each side may be housed separately from one another.

In some implementations, as shown in FIG. 5, a bidirectional amplification device 530 may communicatively couple one or more of the amplifiers 519-2 and 529-2 so that bidirectional amplification of optical sensing signals (including reflected optical sensing signals) may be performed. Other amplifiers 519 and 529 may likewise be communicatively coupled using respective bidirectional amplification devices 530 disposed in repeater housings. As shown in FIG. 5, the bidirectional amplification device 530 may communicatively couple an output of the amplifier 529-2 and an input of the amplifier 519-2. Moreover, the bidirectional amplification device 530 may communicatively couple an output of the amplifier 519-2 and input of the amplifier 529-2.

The bidirectional amplification device 530 may be similar to the bidirectional amplification device 330 shown in FIGS. 3-4 and may include a bidirectional amplifier 534 (e.g., similar to the active gain medium 402 shown in FIG. 4). Optionally, the bidirectional amplification device 530 may include one or more bandpass filter combinations 532*a* and 532*b* that may be communicatively coupled to the bidirectional amplifier 534 and process optical sensing input and/or output signals processed by the respective amplifiers 519, 529 as well as the bidirectional amplifier 534.

During operation, as shown in FIG. 5, an optical sensing signal 539 may optionally be processed by a filter in combination 532*b*, amplified by the bidirectional amplifier 534, optionally be processed by a filter in combination 532*a*, and may be outputted by the bidirectional amplification device 530 as amplified optical sensing signal 535, which in turn, may be input to the amplifier 519-2. The optical sensing signal 539 may include a reflected optical sensing signal that may be a reflected optical sensing signal outputted by the amplifier 529-2 and may be a result of encountering a reflective event (e.g., a break, interference, etc.). The amplified optical sensing signal 535 may be multiplexed with one or more optical sensing signals (and/or optical data signals) that may be input to the amplifier 519-2 for transmission to the sensing receiver 506. As discussed herein, reflected signal(s) may be continuously monitored (e.g., regardless of any reflective event(s)) and/or amplified, if necessary.

Likewise, an optical sensing signal 533 may optionally be processed by a filter in combination 532*a*, amplified by the bidirectional amplifier 534, optionally be processed by a filter in combination 532*b*, and may be outputted by the bidirectional amplification device 530 as amplified optical sensing signal 537. The optical sensing signal 533 may include a reflected optical sensing signal that may be a reflected optical sensing signal outputted by the amplifier 519-2 and may be a result of encountering a reflective event (e.g., a break, interference, etc.) and/or may be continuously monitored (e.g., regardless of reflective events). The amplified optical sensing signal 537 may be multiplexed with one or more optical sensing signals (and/or optical data signals) that may be input to the amplifier 529-2 for transmission to the sensing receiver 504.

In some implementations, the current subject matter may be configured to provide various technical benefits over existing systems. In particular, existing amplifier designs typically require two different fiber amplifiers as a loopback amplifier to amplify counter propagating sensing signals. This is problematic as it requires additional hardware and connections, complicated signal routing, etc., which may lead to signal loss, improper readings, and other issues. The current subject matter provides bidirectional loopback amplification that resolves the above issues by removing requirements of additional amplifiers in its entirety. Further, the current subject matter's bidirectional amplification system also resolves a problem of signal-to-signal crosstalk, which is a problem for some bidirectional amplifiers, by using passive filtering of sensing wavelengths only. Moreover, the active gain medium may include rare earth doped fibers, Raman gain fibers, semiconductor optical amplifier (SOA) devices, and/or any other fiber amplifiers. For uni-directional signal amplification, the bidirectional scheme can also be used for uni-directional amplification only. Additionally, the current subject matter may further simplify structural components by using a single pump laser thereby removing an additional pump requirement.

Figure 6:
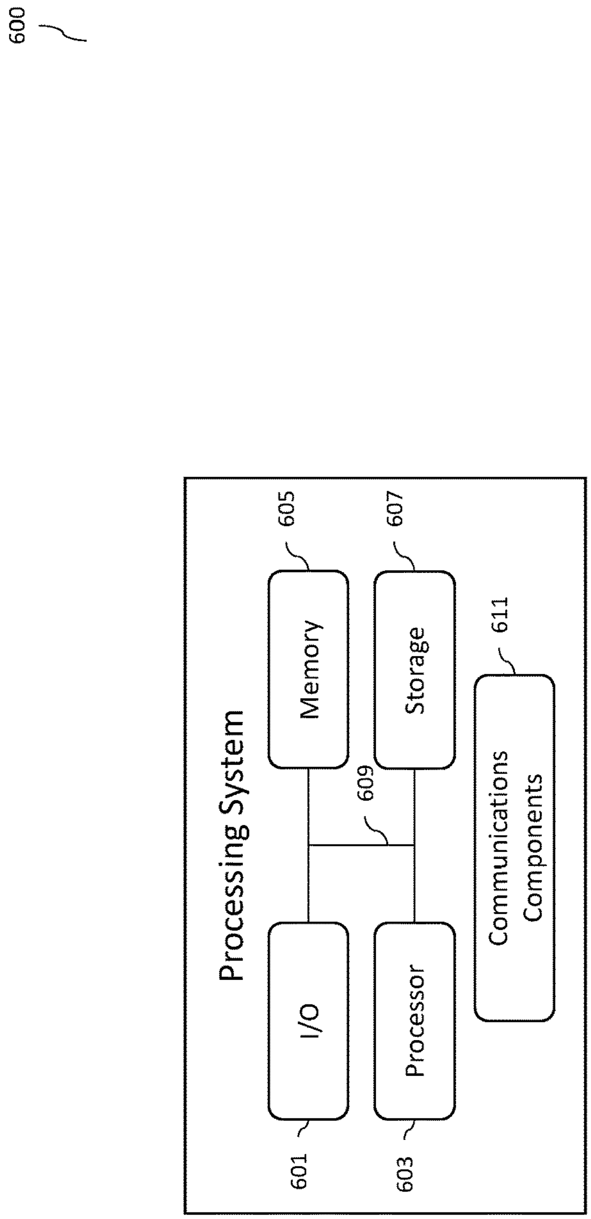
FIG. 6 illustrates an exemplary system, according to some implementations of the current subject matter.

FIG. 6 illustrates an exemplary system 600 for processing and/or controlling one or more operations of the systems shown in FIGS. 2-5. For example, the system 600 may be incorporated into one or more of the sensing receivers 504, 506 and/or sensing transmitters 502, 508 and/or one or more repeater(s) 531, as shown in FIG. 5. Alternatively, or in addition, the system 600 may be incorporated into one or more separately disposed devices and/or components that may be configured to provide controlling functions to the optical communication system(s) shown in FIGS. 2-5. As can be understood, the system 600 may be incorporated into any other device and/or component.

As shown in FIG. 6, the processing system 600 may include an input/output (I/O) device 601, a processor 603, a memory 605, a storage 607, and one or more communication components 611. Each of the components 601-807 may be interconnected using a system bus 609. The processor 603 may be configured to process instructions for execution within system 600. In some implementations, the processor 603 may be a single-threaded processor. Alternatively, or in addition, the processor 603 may be a multi-threaded processor. The processor 603 may be further configured to process instructions stored in the memory 605 and/or in the storage 607, including, but not limited to, receiving and/or sending information through the I/O device 601. The memory 605 may store information within the system 600. In some implementations, the memory 605 may be a computer-readable medium. Alternatively, or in addition, the memory 605 may be a volatile memory unit. In yet some implementations, the memory 605 may be a non-volatile memory unit. The storage 607 may be capable of providing mass storage for the system 600. In some implementations, the storage 607 may be a computer-readable medium. Alternatively, or in addition, the storage 607 may be a floppy disk device, a hard disk device, an optical disk device, a tape device, non-volatile solid-state memory, or any other type of storage device. The I/O device 601 may provide input/output operations for the system 600. In some implementations, the I/O device 601 may include a keyboard and/or pointing device. Alternatively, or in addition, the I/O device 601 may include a display unit for displaying graphical user interfaces.

In some example implementations, one or more components of the system 600 may include any combination of hardware and/or software. In some implementations, one or more components of the system 600 may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example implementations, one or more components of the system 600 may be disposed on a single computing device and/or may be part of a single communications network. Alternatively, or in addition to, such services may be separately located from one another.

In some implementations, the system 600's one or more components may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system 600 also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 600 may include a processor and a memory, and it is understood that the processing circuitry may contain additional components, including processors, memories, error and parity/CRC checkers, data encoders, anti-collision algorithms, controllers, command decoders, security primitives and tamperproofing hardware, as necessary to perform the functions described herein. One or more components of the system 600 may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example implementations, one or more components of the system 600 may execute one or more applications, such as software applications, that enable, for example, network communications with one or more components of system 600 and transmit and/or receive data.

One or more components of the system 600 may include and/or be in communication with one or more servers via one or more networks and may operate as a respective front-end to back-end pair with one or more servers. One or more components of the system 600 may transmit, for example, from a mobile device application (e.g., executing on one or more user devices, components, etc.), one or more requests to one or more servers. The requests may be associated with retrieving data from servers. The servers may receive the requests from the components of the system 600. Based on the requests, servers may be configured to retrieve the requested data from one or more databases. Based on receipt of the requested data from the databases, the servers may be configured to transmit the received data to one or more components of the system 600, where the received data may be responsive to one or more requests.

The system 600 may include and/or be communicatively coupled to one or more networks. In some implementations, networks may be one or more of a wireless network, a wired network or any combination of wireless network and wired network and may be configured to connect the components of the system 600 and/or the components of the system 600 to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, and home networks.

The system 600 may include and/or be communicatively coupled to one or more servers, which may include one or more processors that maybe coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system 600.

The various elements of the components as previously described with reference to FIGS. 2-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some implementations may be implemented, for example, using a machine-readable medium or article which may store an instruction or a set of instructions that, if executed by a machine, may cause the machine to perform a method and/or operations in accordance with the implementations. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writable or rewritable media, digital or analog media, hard disk, floppy disk, Compact Disk Read Only Memory (CD-ROM), Compact Disk Recordable (CD-R), Compact Disk Rewritable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in implementations.

At least one computer-readable storage medium may include instructions that, when executed, cause a system to perform any of the computer-implemented methods described herein.

Some implementations may be described using the expression "one implementation" or "an implementation" along with their derivatives. These terms mean that a particular feature, structure, or characteristic described in connection with the implementation is included in at least one implementation. The appearances of the phrase "in one implementation" in various places in the specification are not necessarily all referring to the same implementation. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single implementation for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separate implementation. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example implementations has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed:

1. An apparatus for transmission of optical signals, comprising:

a repeater bidirectional amplification device communicatively coupled between a first communication terminal and a second communication terminal, the first and second communication terminals are communicatively coupled using an optical communication link, the repeater including a bidirectional amplification device;

a first in-line optical amplifier communicatively coupled between the bidirectional amplification device and the second communication terminal, and configured to amplify one or more optical sensing signals transmitted in a direction of the second communication terminal, and a second in-line optical amplifier communicatively coupled between the bidirectional amplification device and the first communication terminal, and configured to amplify one or more optical sensing signals transmitted in a direction of the first communication terminal;

the bidirectional amplification device is configured to transmit and amplify one or more reflected optical signals received in response to the one or more optical sensing signals transmitted in either direction between the first communication terminal and the second communication terminal, the one or more reflected optical signals indicating a status of one or more portions of the optical communication link.

2. The apparatus of claim 1, wherein the optical communication link is configured to transmit one or more optical data signals.

3. The apparatus of claim 1, wherein a first optical sensing signal in the one or more optical sensing signals is transmitted in a first direction, the first direction being a direction from the first communication terminal to the second communication terminal, wherein the bidirectional amplification device is configured to amplify a first reflected optical signal in the one or more reflected optical signals transmitted in a second direction and received in response to the first optical sensing signal, the second direction being a direction from the second communication terminal to the first communication terminal;

a second optical sensing signal in the one or more optical sensing signals is transmitted in the second direction, wherein the bidirectional amplification device is configured to amplify a second reflected optical signal in the one or more reflected optical signals transmitted in the first direction and received in response to the second optical sensing signal.

4. The apparatus of claim 3, wherein the bidirectional amplification device includes an active gain medium optical component, the active gain medium optical component is configured to amplify at least one of: the first reflected optical signal, the second reflected optical signal, or any combination thereof.

5. The apparatus of claim 4, wherein the bidirectional amplification device includes or is communicatively coupled to at least one of: one or more isolators, one or more wavelength division multiplexing (WDM) optical components, one or more circulators, one or more bandpass filters, one or more optical couplers, or any combination thereof.

6. The apparatus of claim 5, wherein the one or more WDM optical components are coupled to one or more pumps.

7. The apparatus of claim 6, wherein the one or more pumps are laser pumps.

8. The apparatus of claim 7, wherein the one or more isolators are configured to isolate the one or more pumps from one or more optical signals being backscattered from the active gain medium optical component.

9. The apparatus of claim 4, wherein the active gain medium optical component includes at least one of the following: one or more erbium doped amplifiers, one or more doped fiber amplifiers, one or more Raman amplifiers, one or more semiconductor optical amplifiers, or any combination thereof.

10. The apparatus of claim 1, wherein the bidirectional amplification device is communicatively coupled to one or more circulators, the one or more circulators are configured to direct transmission of at least one of: the one or more optical sensing signals, the one or more reflected optical signals amplified by the bidirectional amplification device, or any combination thereof, to the bidirectional amplification device and/or away from the bidirectional amplification device.

11. A method for transmission of optical signals, comprising:

providing a repeater a bidirectional amplification device communicatively coupled between a first communication terminal and a second communication terminal, wherein the first and second communication terminals are communicatively coupled using an optical communication link, the repeater including a bidirectional amplification device;

a first in-line optical amplifier communicatively coupled between the bidirectional amplification device and the second communication terminal, and configured to amplify one or more optical sensing signals transmitted in a direction of the second communication terminal, and a second in-line optical amplifier communicatively coupled between the bidirectional amplification device and the first communication terminal, and configured to amplify one or more optical sensing signals transmitted in a direction of the first communication terminal;

amplifying, using the bidirectional amplification device, one or more reflected optical signals received in response to the one or more optical sensing signals transmitted in either direction between the first communication terminal and the second communication terminal, wherein the one or more reflected optical signals indicating a status of one or more portions of the optical communication link; and transmitting, using the bidirectional amplification device, the one or more reflected optical signals amplified by the bidirectional amplification device.

12. The method of claim 11, wherein the optical communication link is configured to transmit one or more optical data signals.

13. The method of claim 11, wherein a first optical sensing signal in the one or more optical sensing signals is transmitted in a first direction, the first direction being a direction from the first communication terminal to the second communication terminal, the method further comprising amplifying a first reflected optical signal in the one or more reflected optical signals transmitted in a second direction and received in response to the first optical signal, the second direction being a direction from the second communication terminal to the first communication terminal;

a second optical sensing signal in the one or more optical sensing signals is transmitted in the second direction, the method further comprising amplifying a second reflected optical signal transmitted in the one or more reflected optical signals transmitted in the first direction and received in response to the second optical sensing signal.

14. The method of claim 13, wherein the bidirectional amplification device includes an active gain medium optical component, the active gain medium optical component is configured to amplify at least one of: the first reflected optical signal, the second reflected optical signal, or any combination thereof.

15. The method of claim 14, wherein the bidirectional amplification device includes or is communicatively coupled to at least one of: one or more isolators, one or more wavelength division multiplexing (WDM) optical components, one or more circulators, one or more bandpass filters, one or more optical couplers, or any combination thereof.

16. The method of claim 15, wherein the one or more WDM optical components are coupled to one or more pumps.

17. The method of claim 16, wherein the one or more pumps are laser pumps.

18. The method of claim 17, wherein the one or more isolators are configured to isolate the one or more pumps from one or more optical signals being backscattered from the active gain medium optical component.

19. The method of claim 14, wherein the active gain medium optical component includes at least one of the following: one or more Raman amplifiers, one or more erbium doped fiber amplifiers, one or more doped fiber amplifiers, one or more semiconductor optical amplifiers, or any combination thereof.

20. The method of claim 11, wherein the bidirectional amplification device is communicatively coupled to one or more circulators, the one or more circulators are configured to direct transmission of at least one of: the one or more optical sensing signals, the one or more reflected optical signals amplified by the bidirectional amplification device, or any combination thereof, to the bidirectional amplification device and/or away from the bidirectional amplification device.

* * * * *